United States Patent
Muth

(10) Patent No.: US 8,192,280 B2
(45) Date of Patent: Jun. 5, 2012

(54) MEDIA CONTROLLER WITH FINGERPRINT RECOGNITION

(75) Inventor: Michael James Muth, Santa Ana, CA (US)

(73) Assignee: Broadcom Corporation, Irvine, CA (US)

( * ) Notice: Subject to any disclaimer, the term of this patent is extended or adjusted under 35 U.S.C. 154(b) by 655 days.

(21) Appl. No.: 12/367,304

(22) Filed: Feb. 6, 2009

(65) Prior Publication Data

US 2010/0203973 A1 Aug. 12, 2010

(51) Int. Cl.
*A63F 13/00* (2006.01)
*A63F 9/24* (2006.01)
(52) U.S. Cl. .......................................... 463/29; 463/43
(58) Field of Classification Search ...................... 463/29
See application file for complete search history.

(56) References Cited

U.S. PATENT DOCUMENTS

2009/0176566 A1 * 7/2009 Kelly .............................. 463/29

* cited by examiner

*Primary Examiner* — Thien F Tran
(74) *Attorney, Agent, or Firm* — Sterne, Kessler, Goldstein & Fox P.L.L.C.

(57) ABSTRACT

A system and method for retaining, associating, and reloading a user's preferences in a video game system without requiring active participation from the user is provided. The system may include an object control mechanism for receiving a passive indication from the user to perform a fingerprint scan of the user's fingertip. A fingerprint scanner may be coupled to the object control mechanism for transparently performing the fingerprint scan to generate identifying data for the user. If the identifying data for the user matches identifying data for a preexisting user, then preferences associated with the preexisting user may be reloaded. If the identifying data for the user does not match identifying data for a preexisting user, then preferences of the user may retained and associated with the user's identifying data.

19 Claims, 6 Drawing Sheets

MEDIA CONTROLLER WITH FINGERPRINT RECOGNITION

FIELD OF THE INVENTION

This application relates generally to media controllers and more specifically, to media controllers with fingerprint recognition capabilities.

BACKGROUND

Many of today's electronic media devices come equipped with remote control capabilities. A remote control device acts at a distance to send and, in many instances, receive information from an electronic media device. Such electronic media devices may include, for example, video game consoles, set-top boxes used to receive satellite and cable transmissions, digital versatile disc (DVD) players, Blu-ray disc players, and audio playback systems, to name a few.

In video gaming systems, remote control devices may be used to select options and preferences, control movements and actions of characters or objects in a video game, and provide feedback to the user in the form of vibrations, sound, and light. Many video games and video game consoles have user specific options and preferences that may be selected during various stages of game play using a remote control device. Often a user's specific options and preferences remain static or change very little over time. Although a given user's options and preferences for a video game or video game console may generally remain static, a user's specific options and preferences ordinarily must be reselected after each video game playing session or after game play by a subsequent user.

Conventional approaches have attempted to solve the following drawback of video game systems and, in general, media devices by prompting the user to save and associate options and preferences with an identifying characteristic of the user, such as a nickname. In this way, a user may manually restore their options and preferences the next time the media device is used by selecting the identifying characteristic associated with their stored options and preferences. The requirement for a user to manually store, associate, and reload options and preferences in this conventional approach is not ideal and may detract from the entertainment value of these electronic media devices.

Therefore, what is needed is a system and method for retaining, associating, and reloading user specific options and preferences without requiring active participation from the user.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. Example Media System

Figure 1:
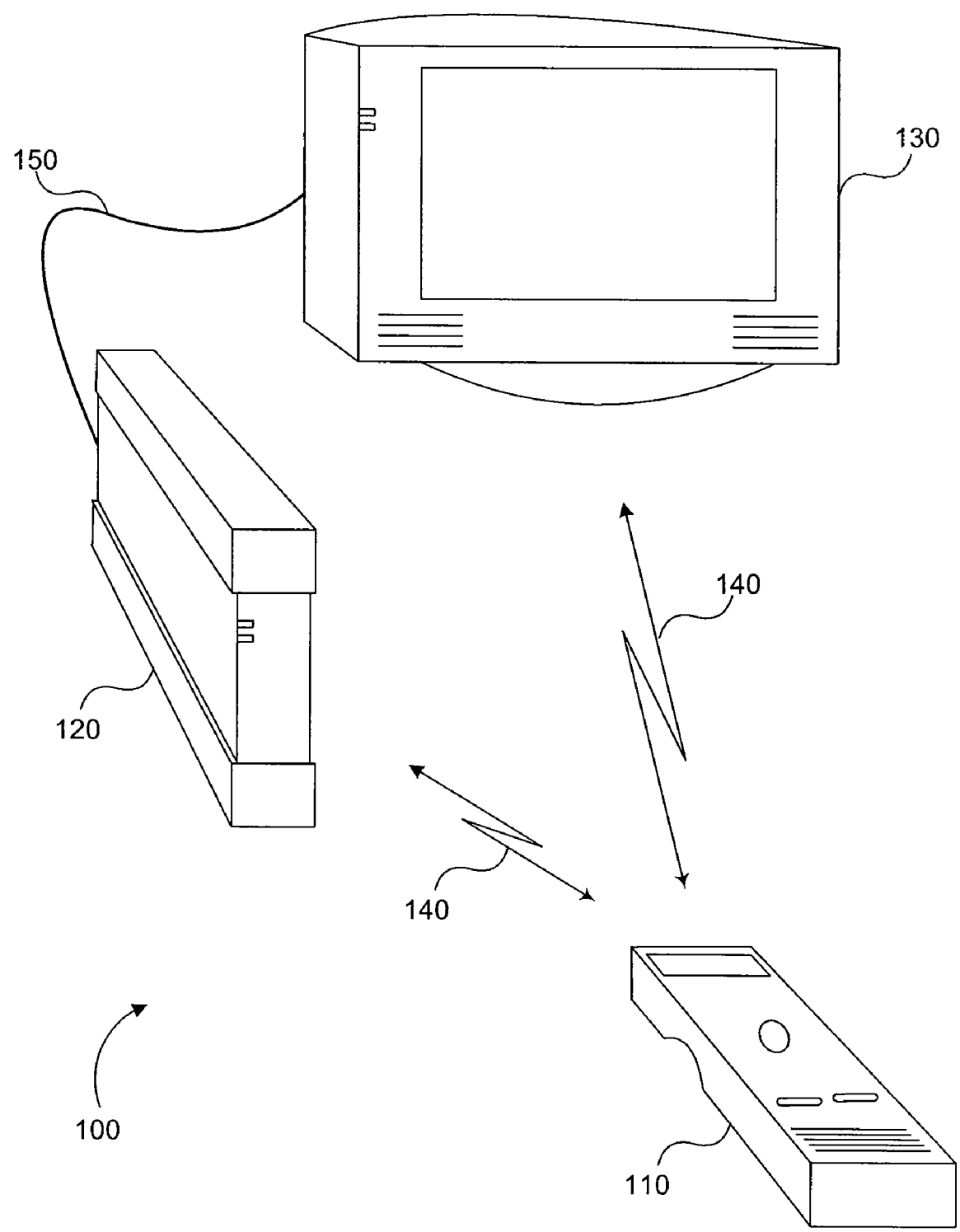
FIG. 1 illustrates an exemplary media system for use with the present invention.

FIG. 1 illustrates an exemplary media system 100 according to embodiments of the present invention. Media system 100 includes controller 110, console 120, and display 130. Together, controller 110, console 120, and display 130 form an exemplary environment that may function to support a video game system or television system for playback of recorded media and/or access to television broadcasts, for example.

Controller 110 may communicate with console 120 and display 130 through wired or wireless means, sending and receiving transmissions at a remote distance. In the specific embodiment illustrated in FIG. 1, controller 110 sends and receives transmissions 140 wirelessly to and from console 120 and display 130. Controller 110 may operate in accordance with any of a variety of wireless communication standards, including but not limited to IEEE 802.11, Bluetooth, infrared, and/or variations thereof. In further embodiments, controller 110 may communicate exclusively with console 120 or display device 130 and may be limited to transmit-only capabilities.

Exemplary media system 100 may function to support a video game system. In this exemplary embodiment, console 120 may be operable to execute a video game program. A video game program executable by console 120 may be stored on a portable storage media such as an optical disc, a remote server, within console 120, and/or any combination thereof. Console 120 may transmit a video display signal, encoding a video game's user interface, to display device 130 over communication link 150. The video display signal may be provided in accordance with any of a variety of formats, including but not limited to, component, composite, and S-Video formats. In general, the user interface provides visual feedback to a user of the video game program. A user may interact with objects or characters displayed by the user interface with controller 110. In typical video game systems, user initiated control signals would be sent from controller 110 to console 120 in order to interact with the user interface. The control signals provided by controller 110 to console 120 may subsequently provoke a change in the user interface, such as a character jumping or moving forward to provide visual feedback to the user.

Before and/or during substantive game play, video game programs and consoles, such as console 120, typically allow or prompt a user to set various options and preferences. These options and preferences may be at the system level or related directly to the video game program. Exemplary system level options and preferences may include, for example, settings related to the sensitivity of controls disposed on controller 110 (e.g., buttons, switches, toggles, and joysticks) and display orientation (e.g., vertical or horizontal partitions in two player mode). Exemplary video game program options and preferences may include, for example, the handedness (i.e., left-handed or right-handed) of the user, music selection, difficulty of play (e.g., hard, medium, and easy), identifying name of the user (e.g., a nickname), and selection of an avatar that may be custom or customizable to a user.

An avatar is a digital representation or caricature that captures the user's actual or desired physical appearance, actual or desired personality, and other attributes. Avatars may take the form of a two-dimensional image or a three-dimensional model and may be found in common video game systems, such as the Nintendo Wii (trademark), where the avatars are referred to as Miis (trademark), the Micorsoft Xbox 360 (trademark), and the Sony Playstation 3 (trademark). In creating the avatar's physical appearance, features that may be selected and adjusted include gender, head, eyes, eyebrows, nose, mouth, facial hair, facial contours, wrinkles, height, and width, to name a few. Other, non-physical attributes of the avatar may be selected and adjusted, such as the name of the avatar and favorite color. A user may select and incorporate their avatar into a video game program to further personalize the user's video game experience.

A user's particular options and preferences for a video game or video game console often remain relatively constant. For example, a user will commonly select the same avatar, handedness, and other options and preferences for each gaming session. However, conventional video game systems require the user to manually reselect their options and preferences, or at least to manually select an identifying characteristic associated with their stored options and preferences before, during or after each gaming session, detracting from the entertainment experience of the user. For example, a user may have to select their custom avatar among all avatars created by users of the video game system before each game play session or after another user's game play session. This manual selection process is often a repetitive, time-consuming step that may become a nuisance to a user. Therefore, video game systems would benefit from a means for retaining, associating, and reloading user specific options and preferences without requiring active participation from the user. In fact, such means may actually enhance the entertainment value in video game systems since the transparent recognition and reloading of a user's options and preferences may appear like magic.

II. Example Controller

Figure 2:
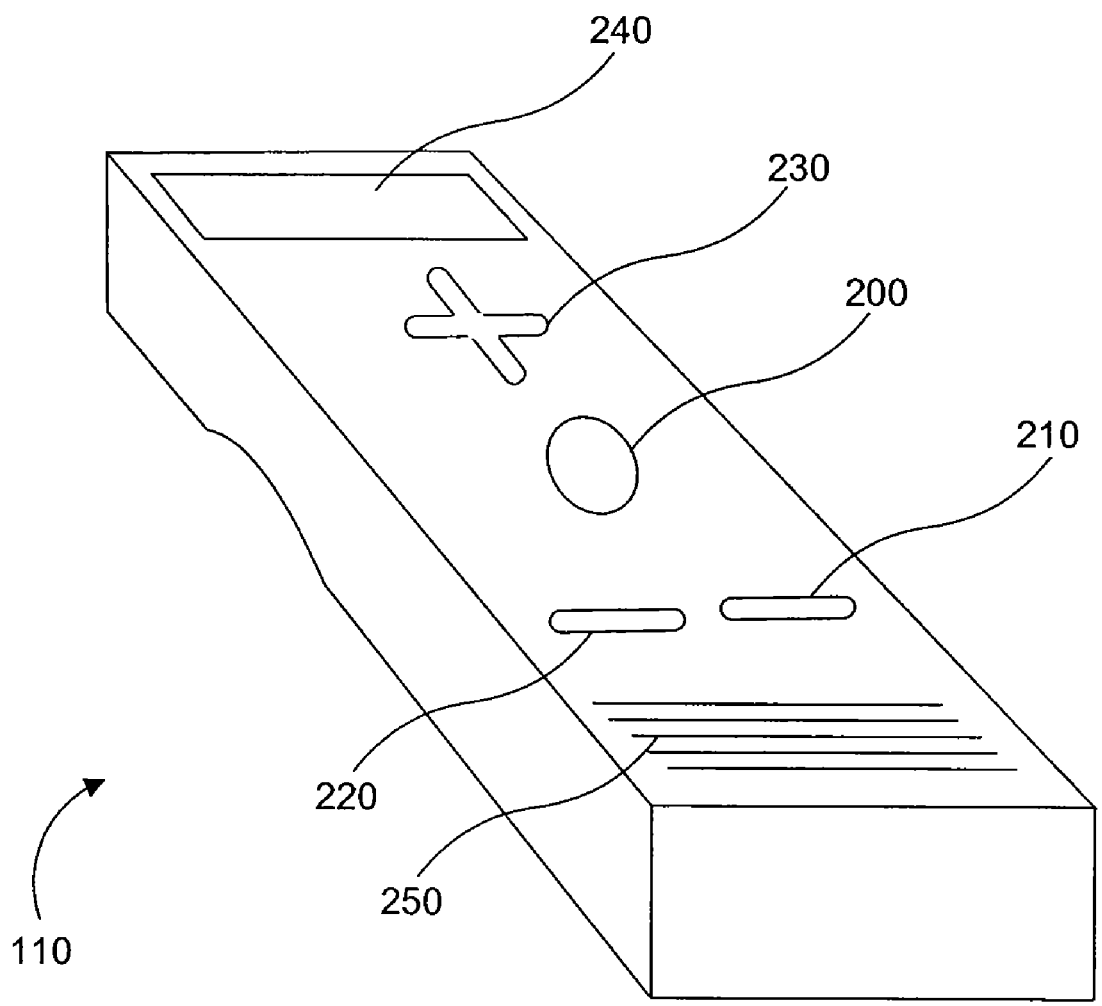
FIG. 2 illustrates an exemplary control device, according to embodiments of the present invention.

FIG. 2 illustrates exemplary controller 110 of FIG. 1 in further detail according to embodiments of the present invention. Exemplary controller 110 may be used in a video game system or television system for playback of recorded media and/or access to television broadcasts, for example. The housing of controller 110 may be grasped by a single hand and may accommodate a range of user hand sizes, including the hand of an adult or a child. Controller 110 includes object controls 200, 210, and 220, directional object control 230, LED(s) 240, and speaker 250. Object controls 200, 210, 220 and directional object control 230 may be buttons or switches, for example. In other embodiments, controller 110 may include fewer, additional, or alternative control and feedback features. For example, controller 110 may include an inclinable stick projecting from the top surface of controller 110. The inclinable stick may provide output operation signals in accordance with the inclining direction of the stick.

As noted above, exemplary controller 110 may function to specifically support a video game system. In this exemplary embodiment, controller 110 may be operable to allow a user to interact with a video game program through a video game console and display device. Information, including control signals, may be sent to and from the video game console or the display device via wired or wireless means. In a wireless implementation, controller 110 may operate in accordance with any of a variety of wireless communication standards, including but not limited to IEEE 802.11, Bluetooth, infrared, and/or variations thereof.

A video game user interacts with a video game program via object controls disposed on controller 110, such as object controls 200, 210, and 220, and directional object control 230. For example, a user may effect a change in the position of a video game character or object via a force exerted by a fingertip on an object control. A user's fingertip would generally push, pull, direct, or move an object control, translating into a specific movement of a video game character or object. In addition, a user employs object controls, such as object controls 200, 210 and 220, and directional object control 230 to select video game options or preferences, including but not limited to those described in Section I.

As noted above, conventional video game systems require the user to manually reselect their options and preferences, or at least to manually select an identifying characteristic associated with their stored options and preferences before, during or after each gaming session, detracting from the entertainment experience of the user. For example, a user may have to select their custom avatar among all avatars created by users of the video game system before each game play session or after another user's game play session. This manual selection process is often a repetitive, time-consuming step that may become a nuisance to a user.

Advantageously, controller 110 may provide means (at least in part) for retaining, associating, and reloading user specific options and preferences without requiring active participation from the user. In other words, controller 110 may provide passive means for retaining, associating and reloading user specific options and preferences, eliminating the need for the user to perform this step in an active fashion.

Controller 110 may achieve this transparent retention, association and reloading of user specific options and preferences through the incorporation of a biometric fingerprint scanner within any one of the object controls disposed on the surface of controller 110. In an embodiment, a biometric fingerprint scanner may be contained within, on, or directly beneath object control 200.

Figure 3:
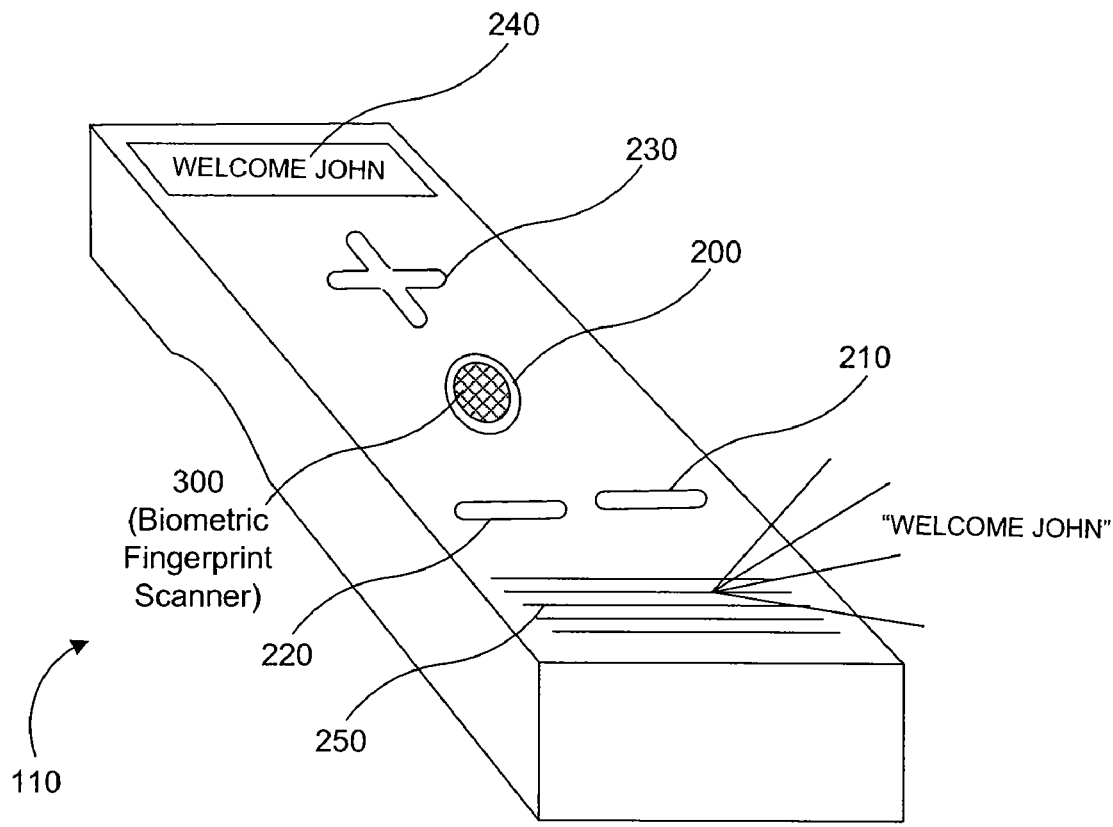
FIG. 3 illustrates an exemplary control device incorporating a biometric scanner in an object control mechanism disposed thereon, according to embodiments of the present invention.

FIG. 3 illustrates controller 110 with a biometric fingerprint scanner 300 contained within, on, and/or directly beneath object control 200 according to an embodiment of the present invention. The biometric fingerprint scanner may be any type of fingerprint scanner capable of being included within, on, and/or directly beneath an object control mechanism, such as object control 200. For example, biometric fingerprint scanner 300 may be any one of a capacitive, optical, and thermal type fingerprint scanner.

In a first embodiment, fingerprint scanner 300 is a capacitive fingerprint scanner. A capacitive fingerprint scanner may be disposed on a semiconductor chip to produce an image of the valleys and ridges present on the surface of a user's fingertip. In capacitive fingerprint scanners, an array of parallel plate capacitors are typically utilized to produce this image, where one plate of each capacitor is formed by the surface of the user's fingertip. The distance between the plates of the capacitors varies according to the contours of the fingertip. By measuring the capacitances (or voltage) of each formed capacitor an image of the fingertip can be produced.

In a second embodiment, fingerprint scanner 300 is a optical fingerprint scanner. An optical fingerprint scanner may utilize a matrix of light-sensitive diodes typically referred to as photosites. These photosites produce an electrical signal in response to photons of light. A fingertip placed on the surface of an optical fingerprint scanner would create portions of lighter and darker areas, which may be sensed and used to form an image of the fingertip.

In a third embodiment, fingerprint scanner 300 is a thermal based fingerprint scanner. In thermal based fingerprint scanners, thermal sensing technology is used to measure the temperature difference according to whether a portion of the fingertip is touching the sensing area or not. In general, areas where the fingertip touches the sensing area correspond to ridges, whereas portions of the sensing area that remain untouched correspond to valleys. Because the thermal based fingerprint scanner can determine or distinguish the relative position of ridges and valleys of a user's fingertip, an image of the fingertip can be produced. Thermal based fingerprint scanners may be produced on a silicon die covered by a pyro-electric material that is sensitive to differences in temperature, for example.

It should be noted that fingerprint scanner 300 may be replaced by any type of biometric identification device capable of identifying a user via one or more fingertips. For example, fingerprint scanner 300 may be replaced by a biometric identification device capable of generating a heart beat profile for a user. The unique characteristics of a user's heartbeat profile may be used to identify a user in a similar manner as a fingerprint profile.

Passivity of user identification may be gained by placing the fingerprint scanner 300 in an object control, such as object control 200, that is frequently used during video game setup or game play or an object control that a user would generally maintain a fingertip on during setup or game play. For example, a user may maintain contact with object control 200 during the majority of game play in anticipation of the need for rapid reaction to a game condition. In addition, the user may maintain contact with object control 200 during the majority of game play as a result of the ergonomic design of controller 110, which may lead to a user's fingertip being naturally positioned on object control 200 in a state of rest.

Although it may be beneficial to incorporate fingerprint scanner 300 in object control mechanisms that exhibit these qualities, in general any object control mechanism may be utilized to achieve passive identification of a user.

Since fingerprint scanner 300 has been incorporated into object control 200, fingerprint scanner 300 may be activated when object control 200 is activated via a force exerted by a user's fingertip. In addition, fingerprint scanner 300 may be activated simply when the user's fingertip is in a state of rest on the surface of the object control mechanism 200. Because these actions by a user would occur throughout various stages of the game, the user does not have to be prompted to either exert a force via a fingertip or to rest their fingertip on the surface of object control 200 such that fingerprint scanner 300 may scan the user's fingerprint. Accordingly, a fingerprint scan of the user's fingertip may be initiated in a passive manner and, as a result, the scanning process may be performed transparently without the user being aware.

In an embodiment, fingerprint scanner 300 may be used to determine if a user's fingertip is resting on the surface of object control 200. For example, in implementing a capacitive type fingerprint scanner 300, a certain change in the scanner's capacitive structures, as a result of a fingertip resting thereon, may trigger a fingerprint scan. Similarly, in implementing an optical type fingerprint scanner 300, a certain amount or change in the light interacting with the surface of fingerprint scanner 300, due to a user's fingertip being placed on object control 200, may trigger a fingerprint scan.

In another embodiment, fingerprint scanner 300 may be activated periodically. For example, after the lapse of a specified period of time a scan may be performed by fingerprint scanner 300.

In additional embodiments, any variation or combination of the above discussed schemes may be used to activate fingerprint scanner 300, including when object control 200 is determined to have been asserted, when a fingertip is determined to be resting on object control 200, or based on the lapse of a predetermined period of time.

After an adequate number of scans (e.g., one, two, or three) a user whom had previously used the device may be identified and their personal options and preferences may be reloaded for game play. A database may be used to store and retrieve the identifying data associated with a user's fingerprint for comparison, as well as their personal options and preferences.

A user whose identifying fingerprint data does not match a record currently stored within the database may be added as a new user. After a new user has been identified and the fingerprint data is stored in the database, personal options and preferences, such as the user's avatar and handedness, maybe be added to the database and associated with their identifying fingerprint data. These options and preferences may be obtained from use of the video game system. In general, a user's options and preferences, stored within the database, may be generically referred to as a "profile". A new or pre-existing user may modify or change their options and preferences during use of the video game system, and their stored profile may be updated accordingly. In general, user options and preferences may be updated based on the most frequently used selection for an option and/or the most recently used selection for an option.

After a user has been identified, controller 110 and/or a display device used within a video game system, such as video game system 100, may provide feedback to the user. As illustrated in FIG. 3, LED(s) 240 may be used to provide an indication of a successful identification by displaying a user's name or nickname. In addition, as further illustrated in FIG. 3, speaker 250 may provide a verbal indication of a successful identification by announcing a user's name or nickname. Another possibility is that an avatar associated with a user appears in the game. Any of the above combinations may be used to provide feedback to the user regarding successful identification in any manner.

Figure 4:
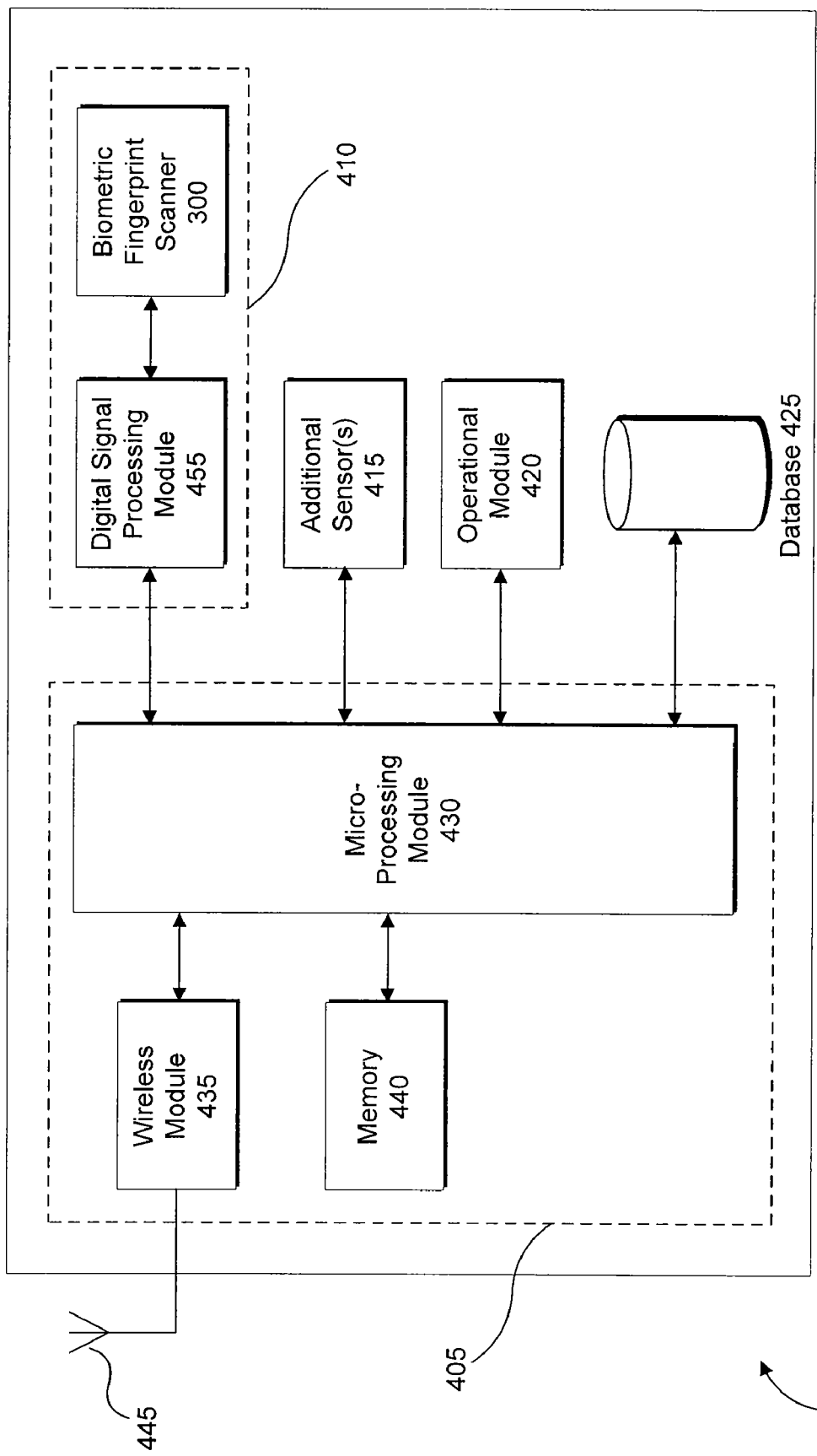
FIG. 4 illustrates an exemplary block diagram of a control device incorporating a biometric scanner in an object control mechanism disposed thereon, according to embodiments of the present invention.

FIG. 4 illustrates a simplified block diagram 400 of a controller 110 in accordance with embodiments of the present invention. Block diagram 400 includes a communications module 405, identification module 410, additional sensor(s) module 415, operational module 420, and database 425.

Communications module 405 includes micro-processing module 430, wireless module 435, memory 440, and antenna 445. Information may be generated at controller 110 from identification module 410, additional sensor(s) 415, operational module 420, and database 425. Operational module 420 may include all object controls (e.g., buttons and switches) disposed on the surface of controller 110, as well as any feedback devices, such as a vibration element, a speaker, and an LED(s). Additional sensor(s) 415 may include, for example, infrared sensors and accelerometers. Information and control signals generated from these modules may be provided to communications module 405 either directly or through a shared bus (not shown) for transmission to console 120. Micro-processing module 430 may perform additional formatting and/or processing on this generated data and temporarily store the data in memory 440. Generated data stored in memory 440 may be subsequently provided to wireless module 435 by micro-processing module 430 at appropriate intervals. Wireless module 435 may format (e.g., encode and modulate) data received from micro-processing module 430 in accordance with a variety of wireless communications standards, including Bluetooth, such that data may be sent via antenna 445 to console 120. Moreover, wireless communications module 405 may be further capable of receiving data wirelessly transmitted thereto from devices including console 120. For example, console 120 may transmit data to control feedback devices contained within operational module 420, such as a vibration element, a speaker, and an LED(s), to name a few.

Identification module 410 includes biometric fingerprint scanner 300 that may be incorporated into an object control, such as object control 200 of FIG. 3, such that a user may be passively identified. As illustrated in FIG. 4, fingerprint scanner 300 may be coupled to a digital signal processing (DSP) module 455. DSP module 455 may be used to process and extract identifying characteristics from a fingerprint image captured by fingerprint scanner 300. In an another embodiment, DSP module 455 may be replaced or supplemented by a micro-processing module, such as micro-processing module 430, which may utilize a program to process and extract identifying characteristics from a fingerprint image captured by fingerprint scanner 300 and/or control DSP module 455.

Moreover, processed and extracted data provided by DSP module 455 (or alternatively a micro-processor) may be stored within a structured memory, such as database 425. Database 425 may be accessed by identification module 410 via micro-processing module 430. In another embodiment, identification module 410 may access database 425 through a direct connection (not shown).

A passive user identification system in accordance with principles of the present invention further comprises an identification process for identifying previous users and reloading their specific options and preferences. In an embodiment, options and preferences for a particular user may be stored within database 425 and associated with their fingerprint identification data stored therein. During the passive user identification process a matching algorithm may be performed by micro-processing module 430 or any other suitable processing module incorporated into controller 110. The matching algorithm may be computer program code having instructions for causing a computer, such as microprocessor 430, to performing the matching algorithm. In further embodiments, the matching algorithm and/or database 425 may be performed in a location other than controller 110, such as within console 120, using the hardware contained therein. In the exemplary embodiment of FIG. 4, micro-processing module 430 and/or DSP module 455 may compare stored identifying data with live biometric data from fingerprint scanner 300. If a match exists, the options and preferences corresponding to the identified user may be reloaded.

Figure 5:
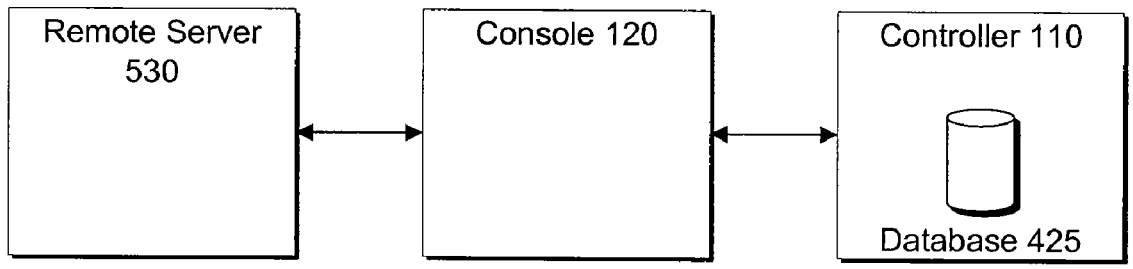
FIG. 5 illustrates exemplary locations for the storage of user identity and profile information, according to embodiments of the present invention.
Figure 5:
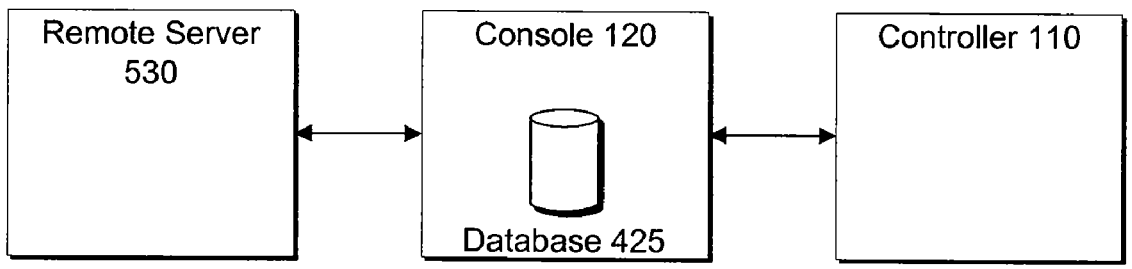
Figure 5:
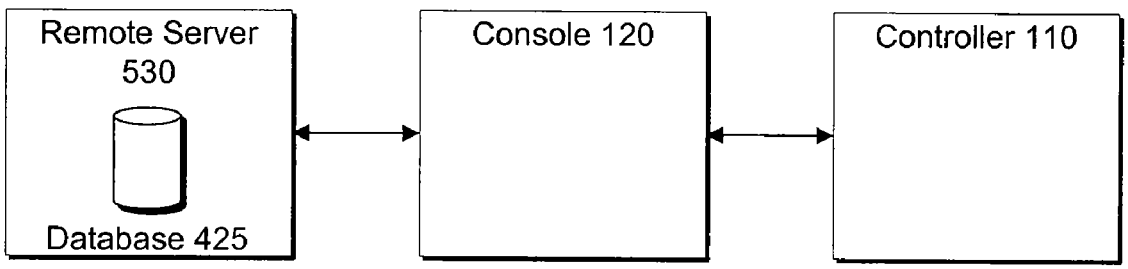

FIG. 5 illustrates exemplary locations for user database 425 that may store user identifying data (i.e., processed or preprocessed fingerprint data) as well as a user's corresponding personal options and preferences, which may be generically referred to as a "profile". Three exemplary video game systems 500, 510, and 520 are illustrated in FIG. 5 that show various possibilities for the location of user database 425. Each exemplary video game system, 500, 510, and 520, is shown as including controller 110, console 120, and remote server 530. Controller 110 may be operable to communicate with console 120. Console 120 may be operable to communication with both controller 110 and remote server 530. Remote server may be accessible to console 120 via wired and/or wireless means over a local or wide area network, such as the internet.

In the first video game system 500 illustrated in FIG. 5, user database 425 is located within controller 110. In this embodiment, controller 110 will be capable of identifying new and previous users and storing their identifying data and corresponding options and preferences within user database 425. After a user has been identified, controller 110 will be further operable to communicate corresponding user options and preferences stored in user database 425 to console 120, such that the video game system may be setup according to the identified user's options and preferences. For example, the identified user's specific avatar preference may be communicated to console 120. Because user database 425 is stored within controller 110, a user may use controller 110 with multiple consoles 120 and still recall and reload their stored options and preferences.

In the second video game system 510 illustrated in FIG. 5, user database 425 is located within console 120. In this embodiment, console 120 will be capable of storing and receiving processed or preprocessed finger print data from controller 110, comparing received fingerprint data to preexisting fingerprint data of previous users stored within user data base 425, and reloading options and preferences stored within user database 425 that correspond to the user of the received fingerprint data (assuming the user has a preexisting stored profile). Because user database 425 is stored within console 120, a user may use any controller 110 and still recall and reload their stored options and preferences. For example, this may be beneficial in typical video game systems where multiple controllers 110 are often used. Implementing user database 425 in console 120 allows a user to recall options and preferences regardless of which controller 110 a user has used in the past.

In the third video game system 520 illustrated in FIG. 5, user database 425 is located within remote server 530. In this embodiment, remote server 530 will be capable of storing and receiving processed or preprocessed finger print data from controller 110 via console 120, comparing received fingerprint data to preexisting fingerprint data of previous users stored within user database 425, and reloading options and preferences stored within user database 425 that correspond to the user of the received fingerprint data (assuming the user has a preexisting stored profile). Implementing user database 425 in remote server 530 allows a user to recall options and preferences regardless of which controller 110 the user has used in the past. Even further, implementing user database 425 in remote server 530 allows a user to use any console 120 and still recall and reload their stored options and preferences.

It should be noted that remote server 530 may be an optional component in video game systems 500 and 510. Moreover, it should be further noted that any combination of the storage locations for user database 425, illustrated in FIG. 5, may be used. For example, user database 425 may be included within controller 110 and console 120. Even further, database 425 may be included within each device: controller 110, console 120, and remote server 530.

Figure 6:
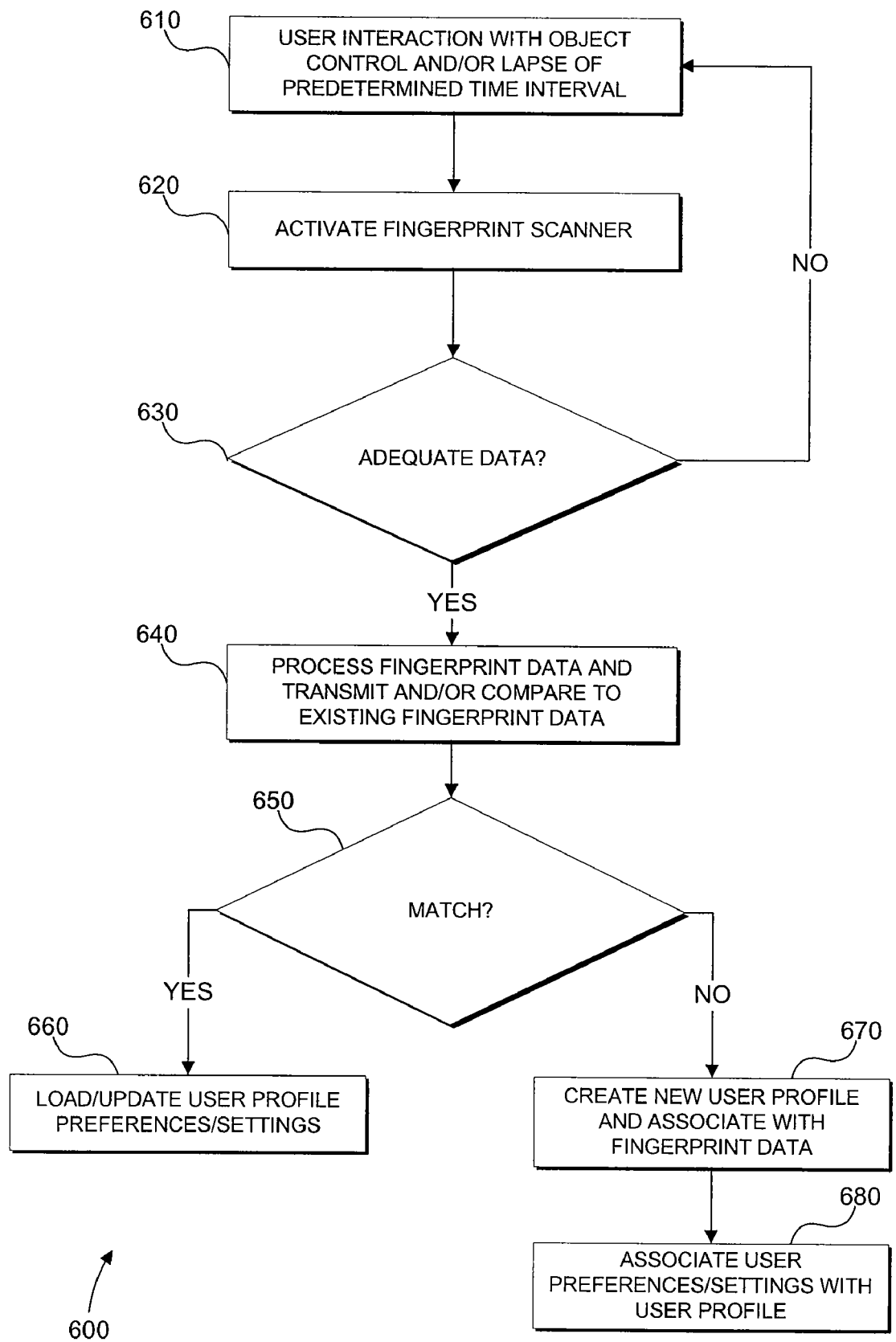
FIG. 6 illustrates a flowchart of an exemplary method for retaining, associating, and reloading user specific options and preferences without requiring active participation from the user, according to embodiments of the present invention.

FIG. 6 illustrates an exemplary flowchart for retaining, associating, and reloading user specific options and preferences without requiring active participation from the user, according to embodiments of the present invention.

At step 610 several different passive indications from the user may trigger the process for retaining, associating and reloading user specific preferences illustrated in flowchart 600. These indications are passive because the user is performing them for a reason(s) other than initiation of flowchart 600. For example, a user may exert a force on object control 200 for the unrelated purpose of starting a video game or selecting an option such as the number of players. This force may cause control object 200 to generate an operational signal that triggers flowchart 600, thereby allowing the fingerprint scan to be transparently performed without the user being aware. In another embodiment, fingerprint scanner 300 may determine that a user has their fingertip resting on object control 200 in the absence of a directed force exerted on object control 200. Alternatively, the process for retaining, associating and reloading user specific preferences may be triggered at step 610 by the lapse of a predetermined interval of time. Any combination of the above mentioned triggers may be used to begin the process illustrated in flowchart 600 as indicated by step 610. After step 610, flowchart 600 proceeds to step 620.

At step 620 fingerprint scanner 300 is activated to produce an image of a user's fingertip. After producing an image of the user's fingertip at step 620, flowchart 600 proceeds to 630.

At step 630 a determination may be made as to whether the image produced by fingerprint scanner 300 at step 620 was successful in terms of capturing certain characteristics of a user fingerprint needed for identification purposes. The predefined characteristics necessary for analysis and identification may be contained in a single image or the data from multiple images may be assembled to provide the predefined characteristics. Adequate data may be achieved after any number of scans. For example, one, two, or three scans may be determined to be adequate. If after a given number of scans the fingerprint data for a particular user produced by fingerprint scanner 300 is inadequate, flowchart 600 will return back to step 610. However, after an adequate number of scans have occurred, and fingerprint data for the user is adequate for identification purposes (within a predetermined tolerance), flowchart 600 proceeds to step 640.

At step 640 a matching algorithm may be run in DSP module 455 or a processing module, such as micro-processing module 430, to determine if the scanned fingerprint data matches a preexisting user's fingerprint data stored within database 425. If the scanned fingerprint data of a current user of controller 110 matches a preexisting fingerprint within database 425, then flowchart 600 proceeds to step 660.

At step 660 the profile corresponding to the identified user, stored within database 425, is accessed and loaded into console 120. Depending on where database 425 is located, fingerprint data and a user's specific options and preferences may be transmitted to and from controller 110 and console 120. During the user's interaction with controller 110 and console 120, their stored options and preferences may be updated accordingly. In general, user options and preferences may be updated based on the most frequently used selection for an option and/or the most recently used selection for an option.

In the event the scanned fingerprint data does not match a preexisting user's fingerprint data stored within database 425 at step 650, flowchart 600 may proceed to step 670.

At step 670 a new user profile may be created within database 425. The new user profile may store the user fingerprint data and associate a user profile with the data for later access. After creating a new user profile at step 670, flowchart 600 may proceed to step 680 where user preferences and settings are stored within database 425. Since this is the first use by the currently identified user, options and preferences selected by the user are stored within database 425 for reloading during a subsequent use of the video game system by the user.

III. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It should by noted that the exemplary process for extracting identifying characteristics from a fingerprint image and/or the matching algorithm described herein can be implemented in hardware, software, or any combination thereof. For instance, the exemplary process for extracting identifying characteristics from a fingerprint image and/or the matching algorithm described herein can be implemented using computer processors, computer logic, application specific circuits (ASICs), digital signal processors, etc., as will be understood by one of ordinary skill in the arts based on the discussion herein.

Moreover, the exemplary process for extracting identifying characteristics from a fingerprint image and/or the matching algorithm can be embodied by a computer processor or any one of the hardware devices listed above. The computer program instructions cause the processor to perform the signal processing functions described herein. The computer program instructions (e.g., software) can be stored in a computer useable medium, computer program medium, or any storage medium that can be accessed by a computer or processor. Such media include a memory device such as a computer disk or CD ROM, or the equivalent. Accordingly, any computer storage medium having computer program code that causes a processor to perform the signal processing functions described herein are with the scope and spirit of the present invention.

Further, as will be apparent to one of ordinary skill in the art, the teachings herein may be applied to any multimedia system utilizing a controller device, such as set-top boxes used to receive satellite and cable transmissions, digital versatile disc (DVD) players, Blu-ray disc players, and audio playback systems, to name a few. The teachings herein may be used to retain, associate, and reload user preferences for these systems without requiring active participation from the user. Such user preferences may include, for example, display settings, audio settings, viewing modes, and channel selections, to name a few.

The breadth and scope of the present invention should not be limited by any of the above-described exemplary embodiments, but should be defined only in accordance with the following claims and their equivalents.

What is claimed is:

1. A method for managing a user's preferences in a video game system, comprising:
   (a) receiving a passive indication from the user to perform a fingerprint scan of the user's fingertip;
   (b) transparently performing the fingerprint scan to generate identifying data for the user, including,
      (i) determining if the identifying data for the user is adequate for identification of the user; and
      (ii) repeating transparently performing the fingerprint scan when the identifying data for the user is not adequate for identification;
   (c) determining if the identifying data for the user matches identifying data for a preexisting user;
   (d) if the identifying data for the user matches the identifying data for a preexisting user, then reloading preferences associated with the preexisting user; and
   (e) if the identifying data for the user does not match the identifying data for a preexisting user, then retaining the user's preferences and associating the user's preferences with the user's identifying data.

2. The method of claim 1, wherein the user's preferences include a selection for a specific avatar.

3. The method of claim 1, wherein the user's preferences include a selection for a specific handedness.

4. The method of claim 1, wherein step (a) comprises:
   receiving a passive indication from the user when the user exerts a force on an object control mechanism, wherein the object control mechanism is one of a button or a switch.

5. The method of claim 1, wherein step (a) further comprises:
   receiving a passive indication from the user when the user positions a fingertip on an object control mechanism, wherein the object control mechanism is one of a button or a switch.

6. The method of claim 1, further comprising:
   (f) updating the user's retained preferences based on a most frequent selection for a specific preference.

7. The method of claim 1, further comprising:
   (f) updating the user's retained preferences based on a most recent selection for a specific preference.

8. The method of claim 1, wherein step (d) further comprises:
   providing feedback to the user indicating that the user has been successfully identified.

9. The method of claim 8, wherein the feedback includes at least one of a visual indication or an audible indication.

10. A video game system configured to manage a user's preferences, comprising:
    an object control mechanism configured to receive a passive indication from the user to perform a fingerprint scan of the user's fingertip;
    a fingerprint scanner coupled to the object control mechanism and configured to transparently perform the fingerprint scan to generate identifying data for the user, determine if the identifying data for the user is adequate for identification of the user, and repeat transparently performing the fingerprint scan when the identifying data for the user is not adequate for identification;
    a database configured to retain the user's identifying data and the user's preferences; and
    identifying means configured to determine if the identifying data for the user matches identifying data for a preexisting user stored within the database, wherein the identifying means is configured to:
       reload preferences associated with a preexisting user if the identifying data for the user matches the identifying data for the preexisting user; and
       retain the user's preferences and associate the user's preferences with the user's identifying data if the identifying data for the user does not match the identifying data for a preexisting user.

11. The video game system of claim 10, wherein the user's preferences include a selection for a specific avatar.

12. The video game system of claim 10, wherein the user's preferences include a selection for a specific handedness.

13. The video game system of claim 10, wherein a passive indication from the user is received when the user exerts a force on the object control mechanism, wherein the object control mechanism is one of a button or a switch.

14. The video game system of claim 10, wherein a passive indication from the user is received when the user positions a fingertip on the object control mechanism, wherein the object control mechanism is one of a button or a switch.

15. The video game system of claim 10, further comprising feedback means for providing an indication that the user has been successfully identified.

16. The video game system of claim 15, wherein the feedback means include at least one of an LED and a speaker.

17. The video game system of claim 10, wherein the fingerprint scanner is at least one of a capacitive, optical, and thermal based fingerprint scanner.

18. A method for managing a user's preferences in a video game system, comprising:
    (a) receiving a passive indication from the user to perform a fingerprint scan of the user's fingertip;
    (b) transparently performing the fingerprint scan to generate identifying data for the user;
    (c) determining if the identifying data for the user matches identifying data for a preexisting user;

(d) if the identifying data for the user matches the identifying data for a preexisting user, then reloading preferences associated with the preexisting user;

(e) if the identifying data for the user does not match the identifying data for a preexisting user, then retaining the user's preferences and associating the user's preferences with the user's identifying data; and (f) updating the user's retained preferences based on a most recent selection for a specific preference.

19. A method for managing a user's preferences in a video game system, comprising:

(a) receiving a passive indication from the user to perform a fingerprint scan of the user's fingertip;

(b) transparently performing the fingerprint scan to generate identifying data for the user;

(c) determining if the identifying data for the user matches identifying data for a preexisting user;

(d) if the identifying data for the user matches the identifying data for a preexisting user, then reloading preferences associated with the preexisting user;

(e) if the identifying data for the user does not match the identifying data for a preexisting user, then retaining the user's preferences and associating the user's preferences with the user's identifying data; and (f) updating the user's retained preferences based on a most frequent selection for a specific preference.

* * * * *

UNITED STATES PATENT AND TRADEMARK OFFICE
CERTIFICATE OF CORRECTION

PATENT NO. : 8,192,280 B2
APPLICATION NO. : 12/367304
DATED : June 5, 2012
INVENTOR(S) : Michael James Muth It is certified that error appears in the above-identified patent and that said Letters Patent is hereby corrected as shown below:

Title Page, Section 57 (Abstract), last sentence, please replace "of the user may retained and associated" with --of the user may be retained and associated--;

Column 5, line 26, please replace "scanner 300 is a optical fingerprint scanner" with --scanner 300 is an optical fingerprint scanner--;

Column 10, line 58, please replace "It should by noted that" with --It should be noted that--; and Column 12, line 31, please replace "the identifying means is configured to" with --the identifying means are configured to--.

Signed and Sealed this
Twenty-fourth Day of July, 2012

David J. Kappos
*Director of the United States Patent and Trademark Office*